March 1, 1932. G. O'CONNOR ET AL 1,847,779
PROTECTED SCREW TAKE-UP
Filed Dec. 8, 1927
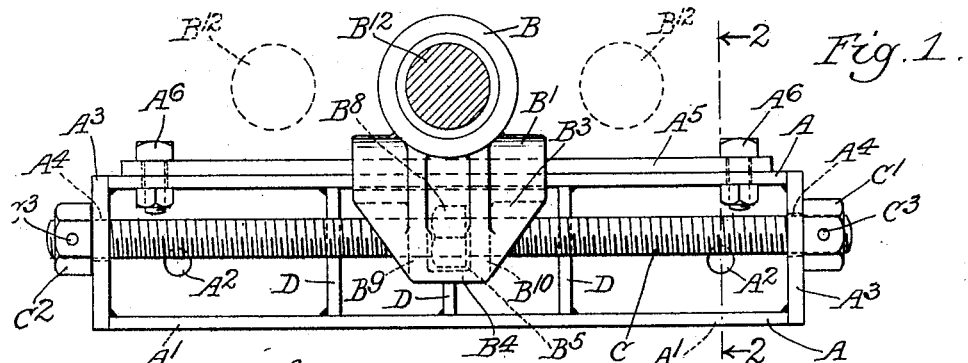
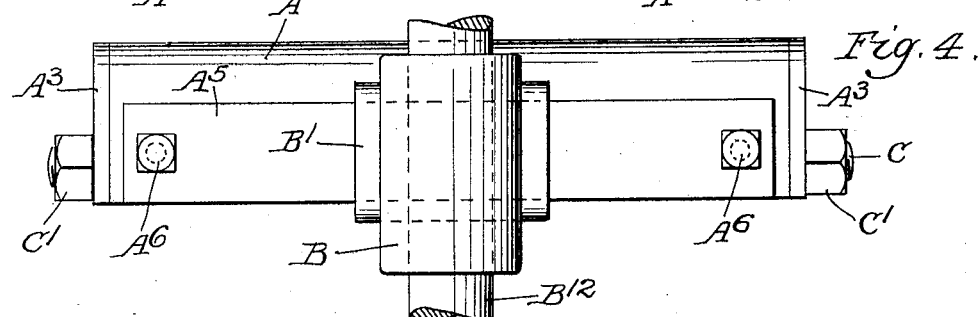
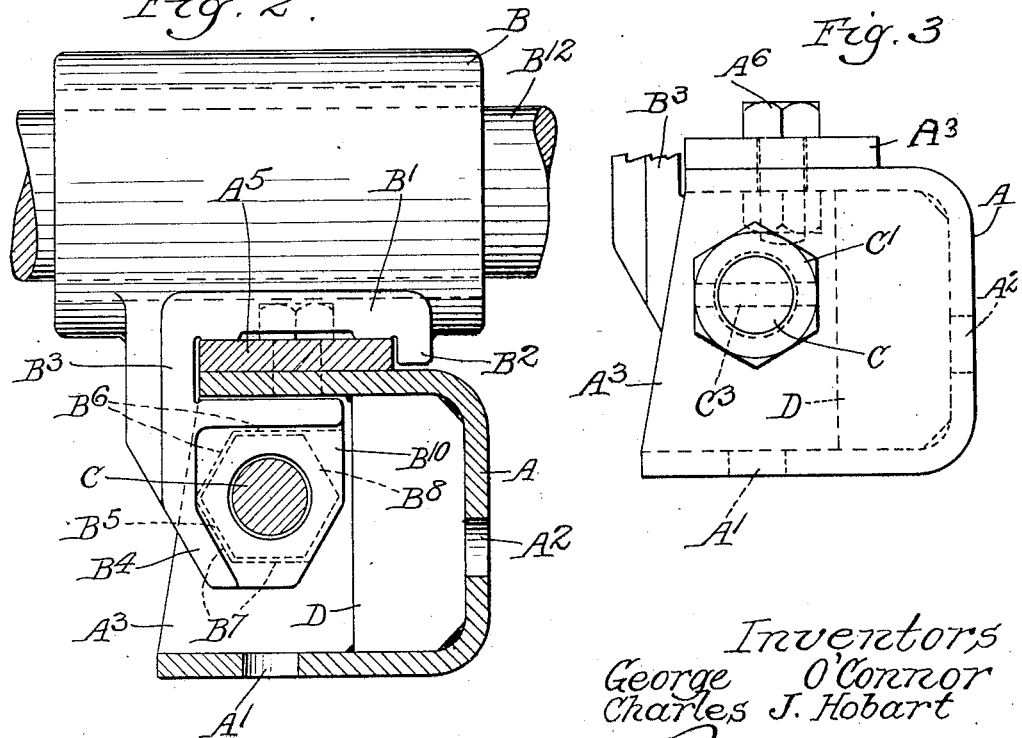
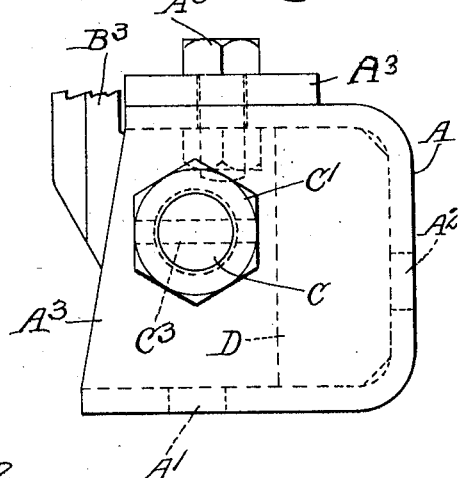
Inventors
George O'Connor
Charles J. Hobart
by Parker & Carter
Attorneys Patented Mar. 1, 1932

1,847,779

UNITED STATES PATENT OFFICE

GEORGE O'CONNOR AND CHARLES J. HOBART, OF CHICAGO, ILLINOIS, ASSIGNORS TO LINK-BELT COMPANY, OF CHICAGO, ILLINOIS, A CORPORATION OF ILLINOIS

PROTECTED SCREW TAKE UP

Application filed December 8, 1927. Serial No. 238,487.

Our invention relates to a new and improved form of protected screw take-ups of the type wherein a bearing is slidably mounted on a base and so associated with a screw that the bearing may be laterally displaced to take up slack in the belt or chain or may be laterally displaced to align a shaft. Among the objects of the invention are to provide a take up wherein the adjusting screw will be enclosed entirely within the supporting housing and remain so enclosed without extensive projections no matter what the position of the take up. Another object is to provide a structure wherein the screw will always be in tension no matter which way the tension on the take up comes. Another object is to provide a take up which will be cheap, light and durable. Other objects will appear from time to time throughout the specification and claims.

Our invenion is illustrated more or less diagrammatically in the accompanying drawings, wherein—

Figure 1 is a side elevation;
Figure 2 is a section along the line 2—2 of Figure 1;
Figure 3 is an end view;
Figure 4 is a plan view.

Like parts are indicated by like characters throughout the specification and drawings.

A is a channel shaped housing. It is provided with apertures at the bottom and at the sides as indicated at $A^1$ and $A^2$ so that the housing and support may be bolted either to a support at its bottom or along its side. The ends of the channel are closed by rigid panels $A^3$ $A^3$ preferably welded to the channel, which panels or end plates are apertured at $A^4$. $A^5$ is a bearing plate extending along the upper outside wall of the frame, preferably held in place at its two ends by the bolts $A^6$ and since it is bolted, it is removable for replacement. This guide member or plate reinforces and stiffens the take up frame and serves as a guide for the bearing which is slidable along the take-up and locks or positions the bearing in place holding it against twisting.

B is a bearing block having on its underside a pad $B^1$ adapted to rest upon the guide plate $A^5$. Lugs $B^2$ $B^3$ extend downwardly from the pad $B^1$ on opposed sides of the guide $A^5$ to hold the bearing against rotation or twisting with respect to the guide. The lug $B^3$ extends down beneath the upper flange or wall of the take-up housing and has a foot $B^4$ extending inwardly into the housing. This foot contains a pocket $B^5$ having nut engaging surfaces $B^6$ $B^7$ inclined one to the other and adapted loosely to engage a nut $B^8$ to hold it against rotation with respect to the foot, the side walls of the foot $B_9$ $B_{10}$ being so positioned with respect to opposed sides of the nut that the nut is held in place but not gripped sufficiently tight to cause binding. A shaft $B^{12}$ is supported in the bearing B.

C is a take-up screw. It extends clear through the take-up housing from end to end being rotatable in the apertures $A^4$ in the end plates $A^3$. $C^1$ $C^2$ are nuts threaded on the ends of this screw where it projects beyond the take-up housing. These nuts are screwed onto the take-up screw far enough to make a tight fit with the ends of the housing but not far enough to jam. Pins $C^3$ hold the nuts against rotation with respect to the screw, the screw being also threaded in the nut $B^8$ and passing through apertures in the walls $B^9$ $B^{10}$ of the bearing foot.

D D are reinforcing plates contained inside the channel intermediate its ends, preferably welded in place. These plates terminate sufficiently short of the take-up screw to clear the nut $B^8$ and the foot $B^4$ and serve to stiffen and reinforce the channel without too greatly increasing the weight of the frame.

The use and operation of our invention are as follows:

The take-up is assembled by placing the bearing on the take-up frame. Then the screw is passed inwardly through one of the holes in the take-up frame, and is threaded through the central nut which is held in place in nut pocket in bearing. Then the two end nuts are screwed into place, and locked. When this is done the two bolts which hold the bearing plate in place, limit the movement of the bearing. The bearing may be moved back and forth along the guide plate and along the take-up by rotating the take-up screw, a wrench working on either end being equally effective.

Movement of the screw since the central nut is held against rotation by the bearing foot will result in moving the entire bearing back and forth along the take-up, the screw having no movement except its rotational movement. It will be noted that the screw extends clear through the end plates of the take-up, the only limitation to the movement of the screw being the engagement of the two end nuts with the opposed outer ends of the end plates so that no matter in which direction the tension on the take-up comes, the load is carried by the screw in tension between the nut on the side of the bearing opposed to the load and the nut engaging the bearing foot. It will be noted that in the preferred form the take-up channel is rolled stock closed at the ends by a welded plate or panel. Obviously of course these parts might be castings but if they were they would have to be heavier to get equal strength and therefore my arrangement preferably takes the form of sheet metal built up take-up frame.

We claim:

1. A take-up comprising a channel open along one side and closed at the ends, a screw contained within the channel and rotatable within the closed ends thereof, a nut on the screw inside the channel, a pad adapted to lie outside of the channel, grooved to engage a track, a track removably mounted on the outside wall of the channel adjacent to the opening therein, a foot integral with the pad extending downwardly and inwardly into the channel, the clearance between the foot and the pad being less than the total thickness of channel and track, the track being held removably in position on the channel and means on the foot to engage the nut and hold it against rotation, said means being also adapted to prevent relative longitudinal movement of the foot and the nut.

2. A take up comprising a channel, closed at top, bottom and one side and open on the other side, the top and bottom exterior surfaces of the channel being parallel to permit the channel to rest directly throughout its entire length upon a suitable supporting device, a track removably mounted on and extending along the upper exterior side of the channel, a pad grooved to engage the opposed sides of the track as its travels therealong, a bearing carried by the pad, an arm extending downwardly at right angles to the pad, across the edge of the channel, a foot carried by the arm extending laterally into the channel, a nut engaged by and carried by the foot, a screw rotatable in the ends of the channel, contained within the channel and in threaded relation with the nut, the depth of the groove in the pad being slightly less than the thickness of the track and so related to it that the wall of the pad, where it is not grooved, engages the side wall of the track to prevent lateral displacement of the pad across the track.

Signed at Chicago, county of Cook and State of Illinois, this third day of December, 1927.

GEORGE O'CONNOR.
CHARLES J. HOBART.